United States Patent
Joffray et al.

(10) Patent No.: US 9,754,104 B2
(45) Date of Patent: Sep. 5, 2017

(54) METHOD FOR SECURING JAVA BYTECODE

(75) Inventors: Olivier Joffray, Meudon (FR); Milan Krizenecky, Meudon (FR)

(73) Assignee: GEMALTO SA, Meudon (FR)

( * ) Notice: Subject to any disclaimer, the term of this patent is extended or adjusted under 35 U.S.C. 154(b) by 479 days.

(21) Appl. No.: 13/133,530

(22) PCT Filed: Dec. 9, 2009

(86) PCT No.: PCT/EP2009/066750
§ 371 (c)(1),
(2), (4) Date: Jun. 8, 2011

(87) PCT Pub. No.: WO2010/066800
PCT Pub. Date: Jun. 17, 2010

(65) Prior Publication Data
US 2011/0239307 A1  Sep. 29, 2011

(30) Foreign Application Priority Data

Dec. 9, 2008  (EP) .................................... 08305900

(51) Int. Cl.
*G06F 7/04* (2006.01)
*G06F 21/54* (2013.01)
*G06F 21/53* (2013.01)

(52) U.S. Cl.
CPC .............. *G06F 21/54* (2013.01); *G06F 21/53* (2013.01)

(58) Field of Classification Search
CPC .......... G06F 21/10; G06F 21/54; G06F 21/53; G11B 20/00086
USPC ................................ 726/26; 717/139; 718/1
See application file for complete search history.

(56) References Cited

U.S. PATENT DOCUMENTS

| | | | |
|---|---|---|---|
| 6,009,512 A * | 12/1999 | Christie | G06F 9/30072 712/218 |
| 2003/0018909 A1 * | 1/2003 | Cuomo et al. | 713/200 |
| 2004/0068726 A1 | 4/2004 | Levy et al. | |
| 2004/0078552 A1 * | 4/2004 | Chauvel et al. | 712/209 |
| 2007/0016744 A1 * | 1/2007 | Stocker et al. | 711/165 |
| 2008/0040607 A1 | 2/2008 | Kaabouch et al. | |
| 2008/0253668 A1 * | 10/2008 | Lamb et al. | 382/233 |

(Continued)

OTHER PUBLICATIONS

PCT/EP2009/066750 International Search Report, Feb. 2, 2010, European Patent Office, P.B. 5818 Patentlaan 2 NL—2280 HV Rijswijk.

(Continued)

*Primary Examiner* — Kambiz Zand
*Assistant Examiner* — Suman Debnath
(74) *Attorney, Agent, or Firm* — The Jansson Firm; Pehr B. Jansson

(57) ABSTRACT

The invention relates to a virtual machine. The virtual machine is set to recognize, in addition to a set of conventional bytecodes, at least one secure bytecode functionally equivalent to one of the conventional bytecodes. It is set to process secure bytecodes with increased security, while it is set to process conventional bytecodes with increased speed. The invention also relates to a computing device comprising such a virtual machine, to a procedure for generating bytecode executable by such a virtual machine, and to an applet development tool comprising such procedure.

7 Claims, 2 Drawing Sheets

(56) References Cited

U.S. PATENT DOCUMENTS

2008/0307409 A1* 12/2008 Lu et al. ..................... 717/174

OTHER PUBLICATIONS

Figure 1:
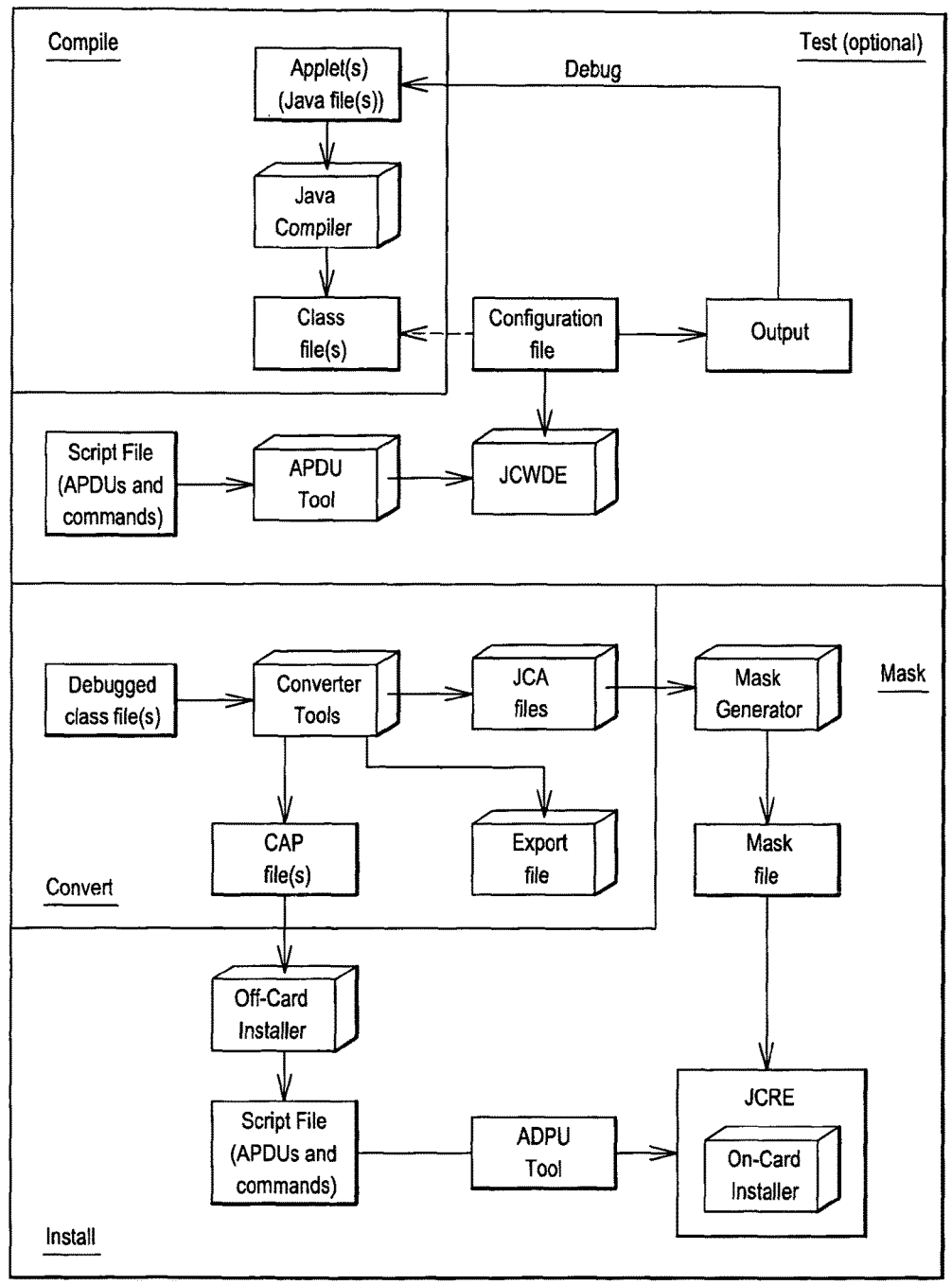

PCT/EP2009/066750 Written Opinion of the International Searching Authority, Feb. 2, 2010, European Patent Office, P.B. 5818 Patentlaan 2 NL—2280 HV Rijswijk—Pays Bas.

* cited by examiner

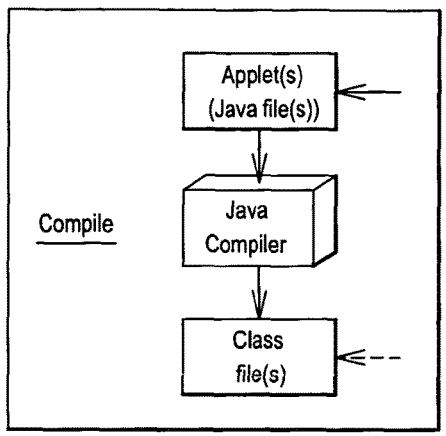
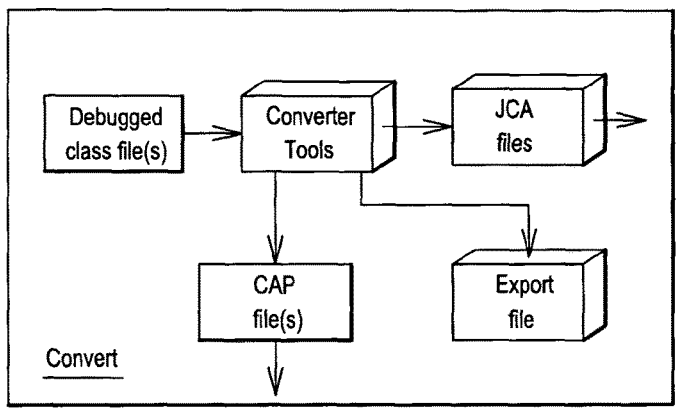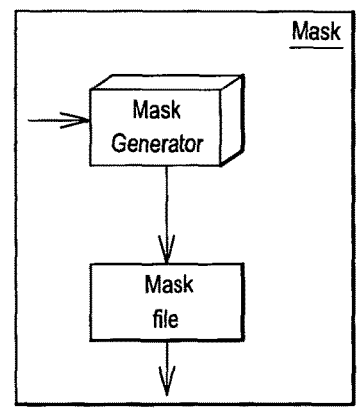
Fig. 3    Fig. 4
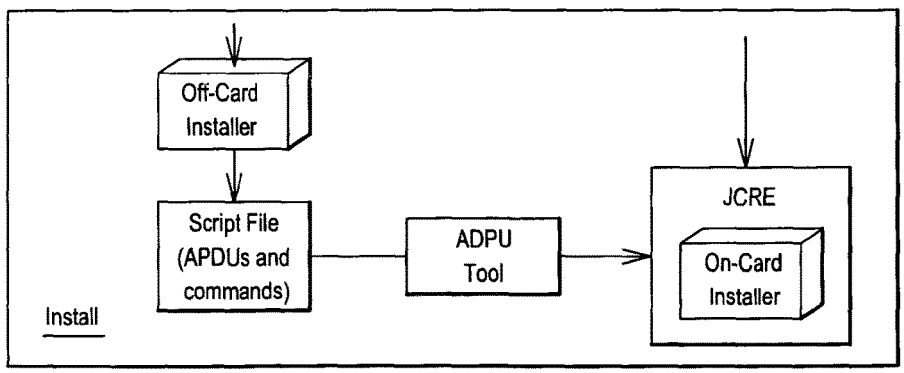
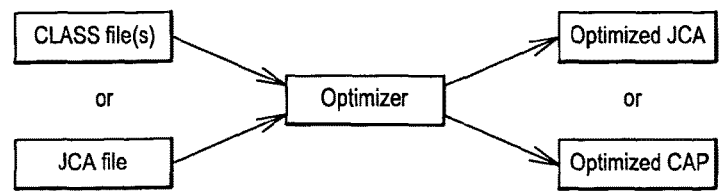
Fig. 6

METHOD FOR SECURING JAVA BYTECODE

The invention relates to securing applets loaded into computing devices, especially security tokens.

BACKGROUND OF THE INVENTION

A security token is typically an electronic device, which is light and small in order to be easily carried by a user (fits easily in a pocket). It is most often personal. In general, a security token is a resource constrained device, in that at least one of the following is true: its processor is not very powerful, it has little memory, it does not have a source of power (battery etc.) nor a user interface, i.e. in order to interact with the security token a user typically needs to connect the security token (either in contact or in contactless mode) with a terminal, which provides some power as well as means to input data into the security token and/or to display or otherwise communicate to the user (e.g. with a sound card, an LED, a buzzer, a vibrator, etc.) certain information sent by the security token. More elaborate security tokens may embed a battery, and/or have input/output capabilities such as a small pinpad, or a small LCD.

The most widespread example of security token is probably the smart card. Billions of smart cards are used in the world, and allow card holders (people carrying the smart card) to authenticate themselves e.g. to a financial institution (e.g. when making payment with a bank card), to a telecom operator (e.g. when passing phone calls with a GSM phone equipped with a SIM card), or to a government organization (e.g. when authenticating with a healthcare smart card, ID smart card, or electronic passport). Many other types of security tokens exist, for example USB keys, parallel port dongles, OTP tokens (OTP stands for One Time Password), TPMs (trusted platform modules, specified by the Trusted Computing Group, and which typically allow to secure a computing device by verifying in particular that the hardware components are not modified, and that any software it runs has the good version and has been properly signed), etc.

During the last decade, the number of security tokens embedding a virtual machine has grown significantly, in particular with the advent of JavaCard, and more recently .NET cards. Such security tokens are advantageous because they can be easily programmed by loading an applet into them (e.g. Java applet, .Net applet, etc.). Due to the fact that security tokens are generally resource constrained, the standards in place (e.g. Java) had to be adapted (for smart cards, it became JavaCard) in order to guarantee that an applet is able to run on the security token. E.G. certain "complex" operations (such as floating point operations) are sometimes not supported.

The JavaCard platform is defined primarily by the following three specifications:
Virtual Machine Specification for the JavaCard™ Platform
Application Programming Interface for the JavaCard™ Platform
Runtime Environment (JCRE) Specification for the JavaCard™Platform The most widespread version of JavaCard is presumably version 2.1, but version 2.2.1 will probably soon become the most widespread. Version 2.2.2 is expected to be the dominant version in the mean term. Version 3 has been released recently but has not yet been widely deployed, it will probably happen a bit later.

A quick overview of the most relevant parts of those specifications is given below.

The JavaCard applet build chain is shown on FIG. 1, it shows the five major steps taking place when building an applet. Each relevant step is described below more in details.

Step 1: Compiling a JavaCard Applet (Shown on FIG. 2)

JavaCard applets are written in the Java programming language, using the JavaCard API subset. A standard java compiler is used to generate class files from java files (which are typically text files, written either with a regular text editor, or with a more user friendly environment which can for example automatically highlight certain keywords in certain colors, etc.).

Step 2: Convert the Applet (Shown on FIG. 3)

The converter is a tool provided by Sun Microsystems to generate JavaCard conform executable files.

Converter input files are:
one or more class files, which together build a javacard package
one or more export files, if the package has external dependencies to other javacard packages Converter output files are:
the package's export file (if the package exports methods, interfaces, classes)
the package's CAP file, which can be loaded on card (in Non Volatile Memory). It is a binary file in compressed format
and/or a JCA file (JavaCard Assembly) file: it is the text representation of a CAP file. Therefore, this file is normally not downloaded on card. It is typically used if the package is to be masked (e.g. in ROM or Flash) with the SmartCard Operating system (see next step).

Step 3': "Romize" the Package (Shown on FIG. 4)

This step is only carried out if it is desired to store the applet in the memory of the card (typically in ROM), in general at chip manufacturing stage. This step is typically performed by a platform specific tool (often called "romizer"), which typically takes all JCA files to "romize" as an input, and links them together in order to generate either an HEX-file that is included in the mask or intermediate files that can be compiled with the Smart Card operating system to generate the complete hardmask with romized packages (also called system libraries). Romizer tools are in general specific to a smart card platform because the link process is strongly tied to the JCVM implementation. The hardmask is typically supplied to a chip manufacturer which can then produce millions of chips comprising the hardmask in question.

Step 3": Load/Install the Package on Card (Shown on FIG. 5)

In this step (which is an alternative to step 3'), the CAP file is not preloaded in the chip, but loaded in the memory of the card (e.g. EEPROM or equivalent memory, e.g. Flash etc.) and therefore the link with the system libraries is performed dynamically by the card, instead of the external romizer tool. Once the CAP is loaded and linked, when executing the program on it, the JCVM behaviour is the same as when executing code in system libraries.

A JavaCard virtual machine instruction consists of an opcode specifying the operation to be performed followed by zero or more operands embodying values to be operated upon. These opcodes are coded on one byte which is the origin of the term bytecode. They are equivalent to a basic assembler instruction for native code. The term "virtual machine" is used because it emulates a processor and its registers with an associated instruction set, composed of all java bytecodes.

The term bytecode is not specific to JavaCard. As explained in particular on Wikipedia, the term bytecode can be used to denote various forms of instruction sets designed for efficient execution by a software interpreter as well as being suitable for further compilation into machine code. Since instructions are processed by software, they may be arbitrarily complex, but are nonetheless often akin to traditional hardware instructions; stack machines are common, for instance. Different parts may often be stored in separate files, similar to object modules, but dynamically loaded during execution. Although the name bytecode stems from instruction sets which have one-byte opcodes followed by optional parameters, bytecodes may have arbitrary formats. Intermediate representations such as bytecode may be output by programming language implementations to ease interpretation, or it may be used to reduce hardware and operating system dependence by allowing the same code to run on different platforms. Bytecode may often be either directly executed on a virtual machine (i.e. interpreter), or it may be further compiled into machine code for better performance.

Unlike human-readable source code, bytecodes are stored in the form of compact numeric codes, constants, references (normally numeric addresses) or other data, which encode the result of parsing and semantic analysis of things like type, scope, and nesting depths of program objects. They therefore allow much better performance than direct interpretation of source code.

A bytecode program is normally executed by parsing the instructions one at a time. This kind of bytecode interpreter is very portable. Some systems, called dynamic translators, or "just-in-time" (JIT) compilers, translate bytecode into machine language as necessary at runtime: this makes the virtual machine unportable, but doesn't lose the portability of the bytecode itself. For example, Java and Smalltalk code is typically stored in bytecoded format, which is typically then JIT compiled to translate the bytecode to machine code before execution. This typically introduces a delay before a program is run, when bytecode is compiled to native machine code, but improves execution speed considerably compared to interpretation—normally by several times.

Because of its performance advantage, today many language implementations execute a program in two phases, first compiling the source code into bytecode, and then passing them to the virtual machine. Therefore, there are virtual machines for Java, Python, PHP, Forth, and Tcl, to name a few. The current reference implementation of Perl and Ruby programming language instead work by walking an abstract syntax tree representation derived from the source code.

Examples of JavaCard bytecodes comprise:
aconst_null (0x01), which pushes the null object reference onto the operand stack
goto (0x70), wherein the value just behind the opcode (bytecode operand) is used as a signed 8-bit offset. Execution proceeds at that offset from the address of the opcode of the goto instruction. The target address must be that of an opcode of an instruction within the method that contains this goto instruction.

The JavaCard 2.2.1 specifications define 185 bytecodes. These bytecodes take all values between 0 and 184 (0xB8). This means that all other values could be used to extend the standard JCVM instruction set.

Sun guarantees that bytecodes 254 and 255 will never be used: "If Sun extends the instruction set of the JavaCard virtual machine in the future, these reserved opcodes are guaranteed not to be used. The two reserved opcodes, numbers 254 (0xfe) and 255 (0xff), have the mnemonics impdep1 and impdep2, respectively. These instructions are intended to provide "back doors" or traps to implementation-specific functionality implemented in software and hardware, respectively. Although these opcodes have been reserved, they may only be used inside a JavaCard virtual machine implementation. They cannot appear in valid CAP files."

JavaCard packages using an extended instruction (i.e. a proprietary instruction distinct from the ones that are standardized, i.e. the 185 ones in case JavaCard 2.2.1 is used) can only be used by smartcards implementing this specific extended instruction set. Therefore, they are essentially used for romized packages. Indeed loadable CAP files often have portability constraints (they are often supposed to be downloadable on different platforms, e.g. SIM cards from different manufacturers) and therefore are less likely to use proprietary bytecodes.

By not using any values between 0 and 184 for extended bytecodes, an extended JCVM guarantees the normal behavior of a standard CAP file which does not use the extended instruction set. All standard features are still supported since none of the 185 standard bytecodes is overwritten by an extended bytecode.

A practical example of extended bytecode is given below:
Xaload_4 (extended aload).
The standard aload bytecode consists in pushing a variable (which index is given as input parameter) into the stack. The opcode for aload is 0x21, and aload works like this:
Binary Format: aload index (1 operand)
Stack: . . . -> . . . , objectref
Effect: index is an unsigned byte that must be a valid index into the local variables of the current method frame. The local variable at index must contain a reference. The objectref in the local variable at index is pushed onto the operand stack.

For index values 0, 1, 2 and 3, the java compiler preferably generates (instead of the regular aload bytecode) bytecodes aload_0, aload_1, aload_2 and aload_3 (each one having a specific opcode, instead of 0x21). The index is implicit (no operand) and therefore the bytecode takes 1 byte (modified opcode with implicit index) instead of 2 (opcode+operand containing the explicit index).

However, JavaCard does not standardize aload_4 and above. It is therefore possible to define a proprietary bytecode Xaload_4, which behaves as aload, but with an implicit index of 4. The same methodology can be used to define bytecodes Xaload_5, Xaload_6, etc.

As seen in the above example with Xaload_4, proprietary bytecodes are very useful to customize the JCVM instruction set according to smart card constraints about code compactness (replacing "long" bytecodes by shorter ones), but they can also be used to improve security (e.g trap byte codes on code branches that should never be reached). Proprietary bytecodes are a major asset for bytecode optimization. For example a new step (shown on FIG. 6) can be inserted between step 2 (shown on FIG. 3) and step 3' or 3" (shown on FIGS. 4 and 5), where the optimizations are performed. Usually, the optimizer takes a standard JCA file, since it holds all needed information, and the next step typically consists in "romizing" the optimized JCA files (or loading the optimized CAP files—the link requires a smartcard equipped with an appropriate extended VM).

There are two important requirements when writing applets for security tokens.
1. The security level should be high, since a security token is supposed to be secure, and for example sensitive data stored in the security token should not be leaked.

2. The overall performance of the security token should remain acceptable, for example for a smart card, an APDU should be executed quickly enough to ensure an acceptable transaction time.

Unfortunately, the two requirements above are in general conflicting, because most often when you increase security you slow down the execution. Enhancing the security of the applet may comprise inserting redundancy checks, which typically adds executable code and increases execution time. And when you want to speed up the execution by "optimizing" the applet, you may often weaken the security.

These requirements are also complex due to the fact that applets (e.g. Javacard applets) are written in a language (typically interpreted) which is normally supposed to be platform independent. I.E. an applet written by one party (e.g. a smart card manufacturer) should be working on any platform, and not only on the platform initially used by that party (e.g. it should work on the smart card of any other manufacturer), as long as the two platform support the same virtual machine (e.g. same version of Java Virtual Machine—aka JVM—).

So far, two main approaches have been put in place.

1. In a first approach, the whole virtual machine is secured, so the applets may use standard APIs. The resulting executable code is highly portable, but the performances are usually poor as the whole execution is secured instead of focusing on sensitive operations only.

2. In a second approach, the virtual machine is optimized for speed. The security mechanisms embedded in the virtual machine itself are much less powerful than in the first approach. It is up to the applet to rely on proprietary APIs in order to secure its execution, by smartly introducing security mechanisms in the most sensitive parts of the applet. The proprietary API typically provides services securing the execution. The functions provided by such proprietary API typically include:

Inserting randomized delay during the execution is order to make it more complex to synchronize operations needed to attack the card with the execution of the applet.

Managing secure counters for following up the execution of the code.

Monitoring alerts when attacks are detected.

The use of such proprietary API is typically made at sensitive places of the applet. These proprietary APIs are usually called several times as the applet is running. It is the use of these proprietary APIs that secures the applet. However, such applet is no longer interoperable, as it relies on proprietary APIs which are not necessarily available on any platform.

Like any other software, smart card ones include branches that are taken depending on tests results during the software execution. In the second approach some of these tests and branches are dedicated to secure the code execution by calling proprietary APIs, and/or to verify security policy enforcement. It is typically a goal of people attacking the smart card to disturb the software execution in order to change the results of some tests, or avoid the execution of some bytecodes. Such attacks can be done in particular by physical means, such as introducing disruption by inserting glitches in the clock, temporarily increasing the power supply, using a laser beam on selected part of the surface of the chip, etc. In the second approach, the applet developers tries to identify sensitive parts of the code, and typically adds some code carrying out verifications in these parts of the code, in order to make the attacker task more complex. But this leads to a bigger executable code size and to inferior performances.

SUMMARY

It is an objective of the invention to propose a new approach to secure the execution of an applet on a computing device, especially on a security token such as a smart card embedding a virtual machine (either on a JVM or another type of virtual machine, such as .NET) by focusing the security on the most sensitive parts of the applet, while running the applet as fast as possible.

The execution should be as secure as possible even when subject to physical attacks.

DETAILED DESCRIPTION

The invention relates in particular to a virtual machine, to a computing device such as a smart card comprising a virtual machine, to a procedure for generating secure bytecode, and to an applet development tool.

A virtual machine according to an embodiment of the invention is set to recognize, in addition to a set of conventional bytecodes, at least one secure bytecode functionally equivalent to one of the conventional bytecodes. The secure bytecode therefore takes the same input parameters as the corresponding conventional bytecode, and provides the same output, in absence of attacks.

The virtual machine is set to process secure bytecodes with increased security, while it is set to process conventional bytecodes with increased speed. It is therefore able to execute some bytecode under very secure conditions (when the secure bytecode is used), but also to complete the same operation (when the conventional bytecode is used) very quickly (i.e. not as securely) in another context (e.g. a context in which an attack is unlikely, or in which a successful attack would not lead to a security risk).

In case an attack takes place, the secure bytecode is expected to offer a higher resistance to the attack than the corresponding conventional bytecode, which could typically be hacked, however the secure bytecode is typically slower.

The secure bytecode is preferably an extended bytecode in order not to overlap with existing bytecodes (this is preferred for interoperability reasons). If there are already extended bytecodes in the virtual machine, it is preferred to avoid any overlapping with them.

It is however conceivable to reuse:
an existing bytecode encoding (referred to as: the encoding of a "discarded bytecode") which is allowed by the standard (if any) or which was used as encoding for an extended bytecode, but is not considered important in a specific context, as:
a secure bytecode encoding associated with another bytecode (referred to as "bytecode to be secured")

For example, if a specific bytecode designed to carry out a factorization is not needed, its encoding can be reused to encode the secure version corresponding to a completely different bytecode, e.g. a bytecode to carry out an exponentiation. But in this case, the virtual machine no longer complies with the standard, since calling the "discarded bytecode" results in the "bytecode to be secured" being executed, in secure mode, instead of the "discarded bytecode".

In a preferred version of the virtual machine, each of the conventional bytecodes has at least one corresponding secure bytecode, i.e. any part of an applet can be executed either with optimized speed or with optimized security, depending on the bytecode used (secure or conventional). It is possible to associate multiple secure bytecodes with a given conventional bytecode, e.g. depending on the aspect which needs to be more specifically secured.

A secure bytecode is preferably encoded as the corresponding conventional bytecode, except that it has an additional prefix (e.g. the byte 0xFF) identifying it as secure. For example, in the context of JavaCard, the secure bytecode corresponding to aload index1, is preferably 0xFF 0x21 0x73, if index1 is equal to 0x73, and considering that the opcode for aload is 0x21. The invention can work with any version of JavaCard, e.g. v2.1, v2.2.1, v2.2.2 or v3.

Other example, in case extended (optimized) bytecodes are in place:

| Standard: | Optimized: | Secured: |
|---|---|---|
| Aload 4 | Xaload_4 | 0xFF Xaload_4 |
| invokestatic 0x72 | invokestatic 0x72 | 0xFF invokestatic 0x72 |

If multiple secure bytecodes are associated with a single conventional bytecode, a different prefix is preferably used for each of such secure bytecodes, and the rest of the secure bytecodes is preferably identical.

In the above examples, there is a code expansion since for every conventional (or extended) bytecode, one more byte is used for each corresponding secure bytecode. But the advantage is that all standard and extended bytecodes can have their secure equivalent(s). It is up to the JCVM, at runtime, when the current java program counter meets a secure bytecode, to identify it as such and execute the associated processing, which will have same functional behaviour as for the conventional bytecode, but performed with a more secure (slower) implementation.

It is possible to use secure bytecode encoding using a single byte for secure bytecodes that are used more often and 2 bytes for the others. It is also possible to use only a partial encoding, which would concern only a subset of well-identified conventional bytecodes that have to be secured. There are many ways to carry out the encoding of secure bytecodes.

The way in which a secure bytecode is implemented (i.e. what exactly is executed when such secure bytecode is invoked), is preferably specific to a given virtual machine implementation and depends on many characteristics (such as: chip, required security level, security mechanisms already implemented by the applet and by the OS of the computing device). In preferred embodiments, secure bytecode implementations take into account state of the art security recommendations, and they may:

Add random delays to make SPA and fault attacks more difficult
Perform checks avoiding branching attacks
Check data consistency/integrity
Add traps when an attack is detected and implement associated responses (card mute, card destroy)

All such countermeasures may have a significant impact on the virtual machine performance, therefore secure bytecodes should only be used when necessary.

A computing device according to the invention comprises a virtual machine as described above. The computing device is preferably a smart card (e.g. SIM card or bank card), in particular a JavaCard compliant or .NET compliant smart card.

According to an embodiment of the invention, a procedure for generating a file comprising bytecodes has the following characteristics. The file is executable by a computing device (e.g. a smart card). The file corresponds to an applet (e.g. a JavaCard or .NET applet to be loaded into the smart card). A subset of the methods of the applet is defined as methods to be secured. The procedure automatically generates, for the methods to be secured, secure bytecodes instead of conventional bytecodes. This reduces attacks on computing devices executing the file. For example, a smart card loading an applet processed according to this procedure can be made more resistant to attacks such as DFA (differential fault analysis attacks). The file generated according to this procedure is executable by a virtual machine according to the invention, embedded in the computing device.

In an improved version of the procedure, the name of the methods to be secured is formatted differently so that the procedure can identify methods to be secured from their name (they could also be identified otherwise, but using the name is very efficient). For example, the formatting may consist in adding a prefix to the name of the method to be secured. This allows a quick identification (by a form of tagging) of which part of the code in the JavaCard applet should be executed very securely.

The procedure can also rely on identification (e.g. by tagging, e.g. with prefix in the name) in the applet, of which variable and/or objects carry sensitive information such that their copies and uses (e.g. as incoming parameter when calling a method), is performed under secure conditions.

In a preferred version of the above procedure, a secure bytecode is encoded as the corresponding conventional bytecode except that it has an additional prefix (e.g. the byte 0xFF, as proposed above in the virtual machine according to the invention).

In order to use secure bytecodes for parts of a JavaCard package, it is preferred to tag the parts of the java code that needs to be "secured". Even if some information like local variable names is lost when transforming a java file into a class file or converted format, the JCA file is in text format and still keeps some information about the original java naming, and for instance a method names is kept as is in original java source code. Therefore, it is possible to define the "securization" granularity as the java method. A "securizer" (a tool implementing the procedure according to the invention, and which can be developed with a methodology similar to the one used for the optimizer known in state of the art) can be invoked on tagged methods.

Since the JCA file holds a method's name, it is possible to define naming conventions for the methods that will be secured. All tagged methods can be processed by the "securizer", while other methods can be kept as they are (and be mapped to conventional bytecode). It is typically up to the developer to identify which methods in his applet are critical and to tag them appropriately.

Example of method tagging:

```
void SECVM_CheckPin( )
{
    // this code will be secured because it has a SECVM prefix
}
void method1( )
{
    // this method will be skipped by securizer and kept as is
}
```

In the above example, any method prefixed with SECVM_ is secured by the "securizer" tool.

It is also possible to use several tags, each one identifying a given security mechanism that should be implemented to protected a tagged method, e.g there could be a tag for protecting more specifically against branching attacks, a tag for protecting more specifically against fault attacks, a tag for protecting more specifically against data corruption etc.

The "securizer" can typically work on the bytecode flow of a method.

All methods of a JavaCard package are described in the method component of a JCA (or CAP) file (see for example, for JavaCard 2.2.1, Virtual Machine Specification for the JavaCard™ Platform, Version 2.2.1, chapter 6: the CAP File Format):

```
method_component
{
u1 tag
u2 size
u1 handler_count
exception_handler_info exception_handlers[handler_count]
method_info methods[ ]
}
method_info
{
method_header_info method_header
u1 bytecodes[ ]                    -> the method's bytecode
}
```

In a JCA file, the information is typically displayed as follows:

```
.method public select( )Z 2 {      -> method name and signature
            .stack 3;              -> method header info
            .locals 2;
            getstatic_a 23;        -> the byte code
            sconst_0;
            ...
}
...
```

The "securizer" tool may parse the JCA file, skipping all components until it reaches the method component. Then it can parse all methods. When a method is tagged with a prefix, part or all bytecodes for this method can be replaced by secure bytecodes. It would be possible to optimize the size of the secured file by switching the virtual machine in secure mode when a number N of consecutive secure bytecodes needs to be executed, and switch back to conventional mode afterwards, therefore avoiding to store N prefixes.

If the method has try/catch blocks, the exception handlers can be updated to use the appropriate offsets within this method in order to guarantee the try/catch block's behavior. The new method size can then be calculated to update the method component's size, and by extension, the header component's size too.

An applet development tool according to the invention comprises means for a developer to tag certain applet methods as secure (typically when writing the applet). For example, the tool may simply provide the ability to type a prefix with the keyboard in front of the name of the method (text editing feature). But in more elaborate versions it is possible to tag a method with a simple click (e.g. right click on the method and selection of the secure tagging, or click on a tagging button, the method being selected before the click, etc.). The applet development tool also comprises conversion means for converting an applet comprising methods tagged as secure into a file comprising bytecodes. The conversion means includes a procedure according to the invention, as described above, in order to generate secure bytecodes for the methods tagged as secure and conventional bytecodes for other methods. For example, in the context of JavaCard, following the compilation of an applet, the resulting files can parsed in order to identify the part of executable bytecode that should be secured. These parts of the executable files can be secured by replacing the original conventional bytecodes by alternative secure bytecodes that are identifiable by the JavaCard Virtual Machine at runtime. Other parts of the file containing the bytecode remain unchanged, so there are optimized for speed.

The preferred embodiments described in relation to any one of the following objects:
  the virtual machine,
  the computing device,
  the procedure, and
  the applet development tool,
apply equally to the other three objects.

The invention claimed is:

1. A computing device comprising a virtual machine operable to recognize, in addition to an instruction set of conventional bytecode instructions each corresponding to a conventional instruction, at least one secure instruction functionally equivalent to one of the conventional bytecode instructions, wherein the virtual machine causes the computing device to recognize a secure bytecode instruction based on a prefix prepended to the corresponding conventional bytecode opcode, said virtual machine causing said computing device:
  to process secure bytecode instructions with increased security by, when executing a secure bytecode instruction, performing an attack-countermeasure operation selected from adding random delays, performing checks to avoid branching attacks, checking data consistency, checking data integrity, adding traps in response to detecting an attack, performing a response such as muting the device or destroying the device, while operable
  to process conventional bytecode instructions with increased speed by, when executing a conventional bytecode instruction, not performing countermeasure operations.

2. A computing device according to claim 1, wherein the computing device is a smart card.

3. A procedure for providing a security device with improved capability for balancing security and execution performance tailored to security and performance requirements of applets executed on the security device, comprising:
  loading, on the security device, a virtual machine, said virtual machine causing said computing device
    to process secure bytecode instructions with increased security by, when executing a secure bytecode instruction, performing an attack-countermeasure operation selected from adding random delays, performing checks to avoid branching attacks, checking data consistency, checking data integrity, adding traps in response to detecting an attack, performing a response such as muting the device or destroying the device, while causing said computing device, and
    to process conventional bytecode instructions with increased speed by, when executing a conventional bytecode instruction, not performing countermeasure operations;

processing an applet using an applet development tool operable to process security tagged applet methods, the development tool comprising conversion means for converting an applet comprising methods tagged as secure into a file comprising bytecode opcodes, the conversion means including a procedure for generating a executable file comprising bytecode opcodes wherein each bytecode opcode corresponds to an instruction, the executable file being executable by a computing device, the executable file corresponding to an applet, the procedure comprising when processing a subset of the methods of the applet being defined as methods to be secured, the procedure automatically generates, for the methods to be secured, secure bytecode opcodes instead of conventional bytecodes by prepending a conventional bytecode opcode to be secured with a prefix code, wherein a secure bytecode instruction is encoded using the opcode corresponding to the conventional bytecode instruction except that encoding of the secure bytecode instruction has an additional prefix, thereby reducing vulnerability to attacks on computing devices executing the file; and loading, on said security device, said executable file whereby upon execution of said executable file by said virtual machine methods of the applet tagged for secured execution are executed with at least one of said attack-countermeasure operations whereas methods not tagged for secured execution are executed by said security device with increased speed by not performing such countermeasure operations.

4. The procedure according to claim 3, wherein the applet is a javacard applet.

5. The procedure according to claim 4, wherein the specific prefix is the byte OxFF.

6. The procedure according to claim 3 wherein the name of the methods to be secured is formatted differently so that the procedure can identify methods to be secured from their name.

7. The procedure according to claim 6, wherein the formatting consists in adding a prefix to the name of the method to be secured.

* * * * *